Nov. 27, 1945.    D. W. MAIN    2,389,798
PITCH CONTROL DEVICE FOR ROTOR BLADES
Filed Jan. 13, 1943    4 Sheets-Sheet 1

INVENTOR,
DAVID W. MAIN.
BY
Martin E. Anderson
Attorney

Nov. 27, 1945.                D. W. MAIN                2,389,798
                PITCH CONTROL DEVICE FOR ROTOR BLADES
            Filed Jan. 13, 1943            4 Sheets-Sheet 2

INVENTOR,
DAVID W. MAIN.
BY
Martin E. Anderson
Attorney

Nov. 27, 1945.   D. W. MAIN   2,389,798
PITCH CONTROL DEVICE FOR ROTOR BLADES
Filed Jan. 13, 1943   4 Sheets-Sheet 3
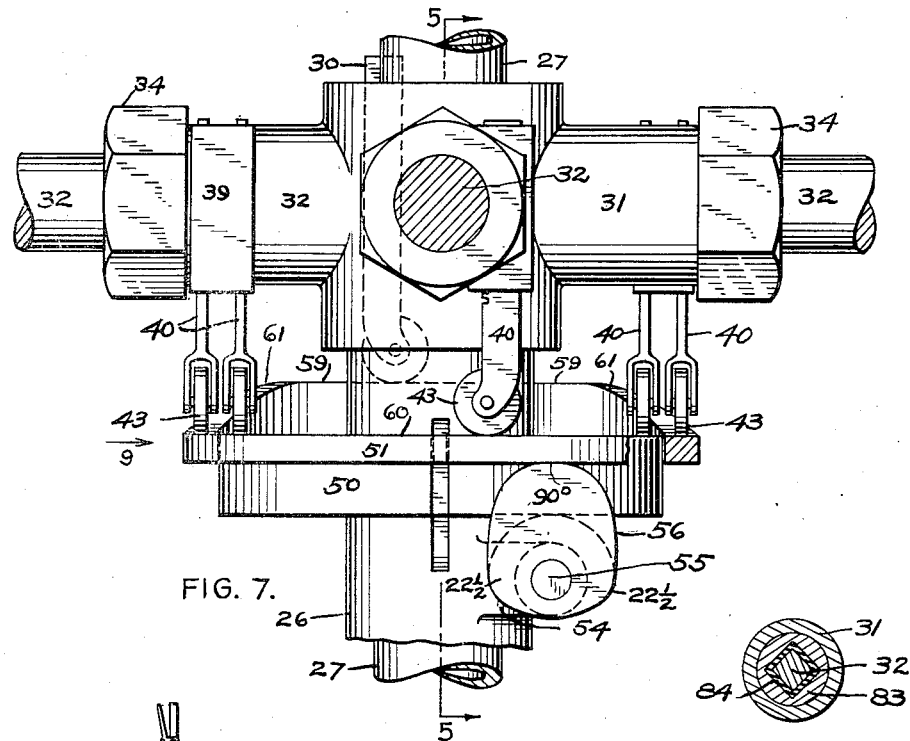
FIG. 7.
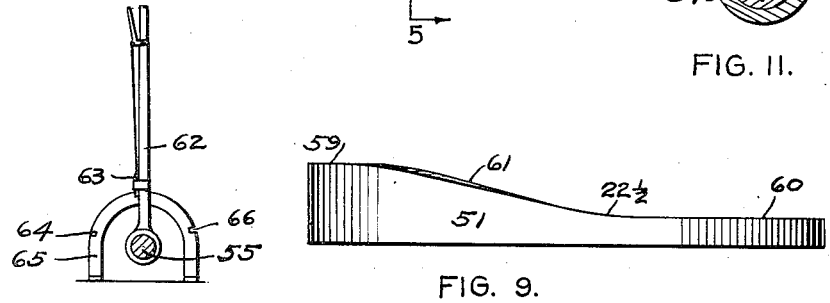
FIG. 9.
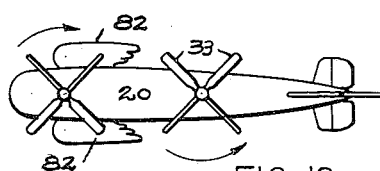
FIG. 8.
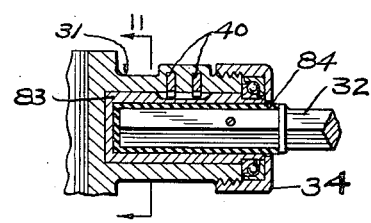
FIG. 10.
FIG. 11.
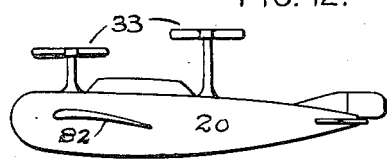
FIG. 12.
FIG. 13.
INVENTOR,
DAVID W. MAIN.
BY Martin E Anderson
Attorney Nov. 27, 1945.  D. W. MAIN  2,389,798
PITCH CONTROL DEVICE FOR ROTOR BLADES
Filed Jan. 13, 1943  4 Sheets-Sheet 4
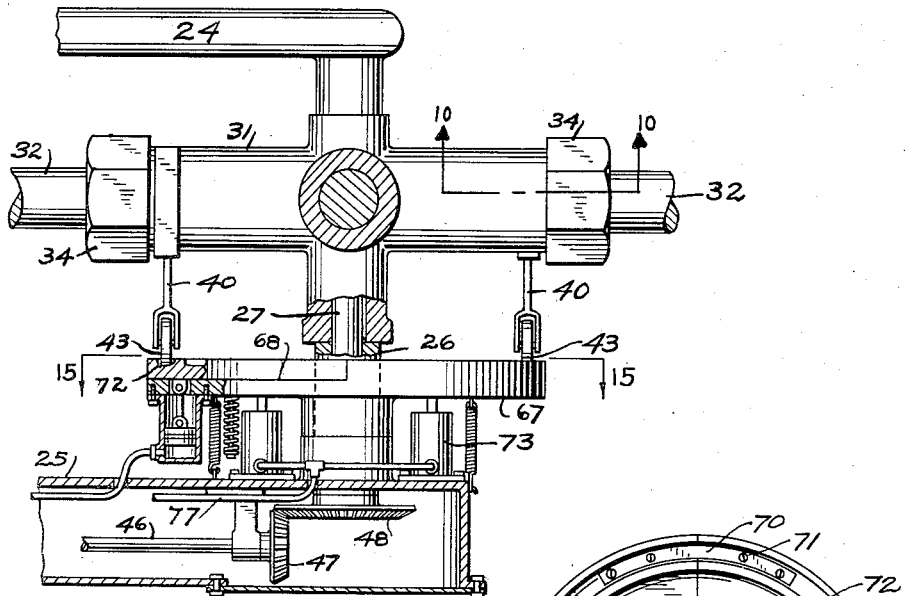
FIG. 14.
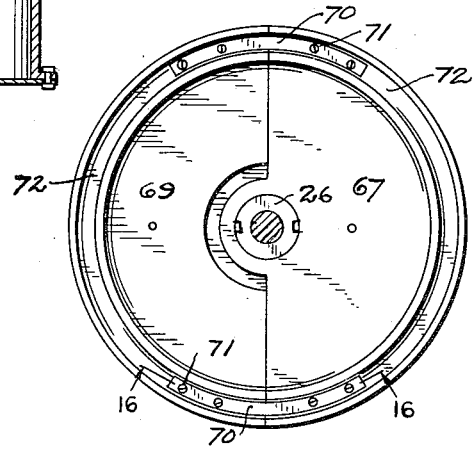
FIG. 16.
FIG. 15.
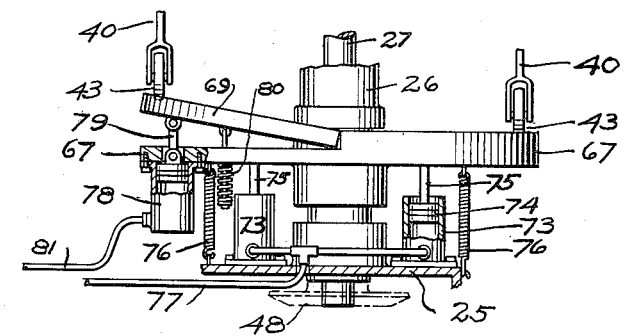
FIG. 17.
INVENTOR,
DAVID W. MAIN.
BY
Martin E Anderson
attorney Patented Nov. 27, 1945

2,389,798

UNITED STATES PATENT OFFICE 2,389,798

PITCH CONTROL DEVICE FOR ROTOR BLADES

David W. Main, Denver, Colo.

Application January 13, 1943, Serial No. 472,269

2 Claims. (Cl. 244—17)

This invention relates to improvements in airplanes embodying, to some degree, the principle of the "helicoper."

It is the object of this invention to produce an improved pitch control device for rotor blades which will permit convenient and ready adjustment of the pitch angles.

A still further object of the invention is to produce an airplane in which the lifting capacity can be increased or decreased at the will of the operator and in which the tractive effort producing forward motion can similarly be modified while the airplane is in operation.

A further object is to produce an airplane of such construction that in case of engine failure, it will not fall abruptly but will descend slowly and land at a speed sufficiently low to prevent the destruction of the plane and the killing of the people therein.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 7 is a view partly in section and partly in elevation showing the blade pitch changing mechanism in its relation to the propeller hub, this view being taken substantially on lines 7—7, Figure 3;

Figure 8 is a fragmentary side elevation showing a control handle by means of which the blade pitch is regulated;

Figure 9 is a view looking in the direction of arrow 9, Figure 7, and shows the appearance of the outer cam member;

Figure 10 is a diametrical section taken on line 10—10, Figure 14, and shows the manner in which the propeller blades are connected with the hub;

Figure 11 is a section taken on line 11—11, Figure 10;

Figure 12 is a top plan view of a slightly modified form of airplane;

Figure 13 is a side elevation of the plane shown in Figure 12;

Figure 14 is a view partly in section and partly in side elevation showing a modified form of construction;

Figure 15 is a plan view looking in the direction of arrows 15—15, Figure 14;

Figure 16 is a section taken on line 16—16, Figure 15; and

Figure 17 is a view somewhat similar to that shown in Figure 14, but showing the parts in operative position.

Figure 1:
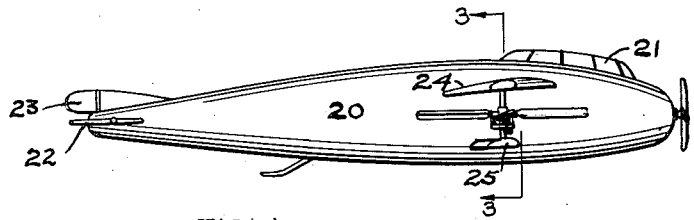
Figure 1 is a side elevation of an airplane constructed in accordance with this invention.

In the drawings reference numeral 20 designates the fuselage of an airplane. This fuselage has been shown as of ordinary cigar shape and is provided with a hood 21 of transparent material in which is positioned the pilot. The rear end is provided with adjustable ailerons 22 for the adjustment of flight in a vertical direction and with a rudder 23 for determining the lateral direction of flight. In the present embodiment, the fuselage is provided with oppositely projecting wings 24 which are outwardly tapering, but whose transverse cross section is similar to that of wings of airplanes of ordinary construction. Wings 24 serve, to some extent, as sustaining members for the fuselage, but are intended to serve more particularly as laterally extending brackets for supporting the upper bearings of a pair of lifting and tractive propellers, in a manner to be hereinafter described.

Positioned beneath the wings 24 are laterally extending brackets 25 of smaller cross sectional area than the wings 24 and these serve as the lower supports for propeller bearings and as housings for the shaft and gears by means of which motion is transmitted to the propellers in a manner to be hereinafter described.

Figure 5:
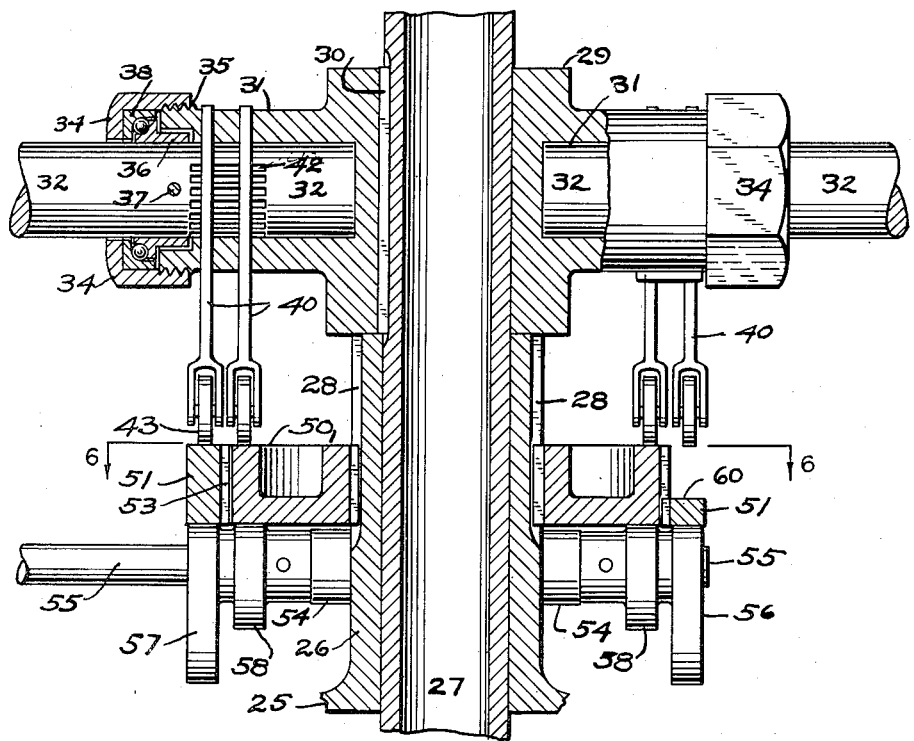
Figure 5 is a section taken on line 5—5, Figure 7.
Figure 6:
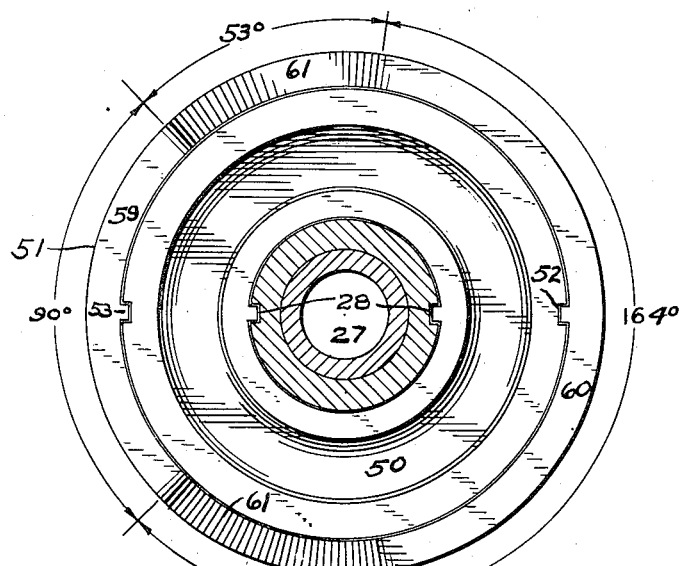
Figure 6 is a section taken on line 6—6, Figure 5.

Referring now more particularly to Figures 5, 6 and 7, it will be seen that each bracket 25 is provided with an upwardly extending tubular bearing 26 in which the hollow propeller shaft 27 is mounted for rotation.

Figure 4:
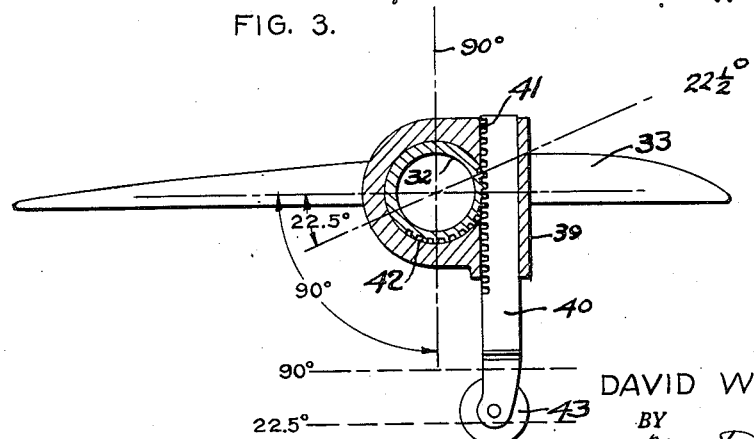
Figure 4 is a section taken on line 4—4, Figure 3, and shows the means employed for altering the pitch of the blades.

In the drawings, bearings have all been shown as single bearings so as to simplify the drawings. It is, however, to be understood that roller, cone or ball bearings can be employed in the place of the ordinary friction bearings shown. The bearings 26 have cylindrical outer surfaces and are provided with spline grooves 28. Secured to the shaft above the bearing 26, is a propeller hub 29 which is held against rotation by means comprising a key 30 positioned in suitable spline grooves formed in the shaft and hub. The hub is so mounted that it will not accidentally move either longitudinally or rotatably with respect to the shaft. In the embodiment illustrated, the hub is provided with four radially extending tubular bearings 31 in which the root portions 32 of the blades 33 are rotatably mounted. In the embodiment illustrated, the actual construction of the bearings has not been shown, but in place thereof a simple construction employing a removable cap 34 threadedly connected to the outer end of each radial bearing, as indicated at 35. An inner ball race 36 has been shown as secured to the shaft by means of a pin 37 and the outer ball race 38 has been shown as positioned in the cap. This construction permits the blades to turn about their axes and prevents longitudinal movement. Each radial bearing 31 is provided on the leading side with a transverse enlargement 39 which is provided with openings in which the racks 40 are mounted for reciprocation. The racks are preferably of rectangular cross section and the teeth 41 are in engagement with the teeth 42 of the root portions 32, in the manner shown most clearly in Figure 4. It will be evident from an inspection of Figure 4 that whenever the rack 40 is reciprocated, as, for example when it is moved upwardly from the position shown in this figure, it will rotate the root portions 32 and the attached propeller blades 33. In the drawings the propeller blade has been shown in zero pitch position by full lines, and its position for the purpose of providing a lifting force has been designated by a dash and dot line which has been identified with the character 22½°. The 22½° angle is intended to designate the normal pitch for the purpose of obtaining a lifting force, but has been arbitrarily chosen and it is not the intention to be in any way limited to this degree of pitch for this particular purpose. The maximum rotary adjustment of the propeller blades has been indicated by the vertical line designated 90°. It is evident that by properly reciprocating the racks 40 the propeller blade or blades can be adjusted angularly with respect to their planes of rotation.

In the drawings, the lower end of each rack 40 has been shown as provided with a roller 43 which rests on the dotted line 0°. When the roller is in this position the propeller blade has its transverse axis in the plane of rotation and this is the position employed during the warming up period which normally precedes every flight. After the engine has been warmed up so as to operate properly, the rack 40 is moved upwardly until the roller 43 rests on the line designated by 22½° in which position the propeller blades have an inclination of 22½° with the plane of rotation. By moving the rack upwardly until the roller rests on the line designated 90°, the transverse axis of the propeller blade will be vertical as indicated by the line designated by 90°. The airplane is provided with an internal combustion engine which has been indicated by dotted lines in Figure 3 and designated by reference numeral 44. The engine is connected by some suitable motion transmitting means such as bevel gears 45 with a transversely extending shaft 46. Shaft 46 extends laterally through the brackets 25, and is provided at each end with a bevel gear 47 like that shown in Figure 14. Bevel gears 47 cooperate with other bevel gears 48 secured to the lower end of each propeller shaft 27. Whenever shaft 46 rotates, it produces a corresponding rotation of shafts 27, the latter rotating in opposite directions, due to the position of the gears 47 and 48. In the present embodiment, when viewed as in Figure 2, the propellers rotate in the direction indicated by the arrows 49.

Referring now more particularly to Figures 5, 6 and 7, it will be observed that two concentric annular cam members 50 and 51 surround the bearing 26. The smaller cam member 50 is provided with projections that engage in the grooves 28 for the purpose of preventing it from rotating about the bearing 26 while permitting longitudinal movement. The outer surface of cam member 50 is provided with grooves 52 into which the splines 53 of the outer cam member project. It will be apparent that neither cam 50, nor 51, can rotate relative to the bearing 26 nor relative to each other and at the same time they may move longitudinally with respect to each other. The lower end of the bearing 26 is provided with a lateral projection 54 which serves as a bearing for a shaft 55. Shaft 55 has secured thereto two duplex cams 56 and 57 which are alike with the exception that one is a right and the other a left. A smaller cam 58 is so positioned that it engages only with the under surface of the cam member 50 and the other cams 56 and 57 engage only with the outer cam 51. When the parts are in the position shown in full lines in Figure 5, the upper surface of cam member 50 and also the upper surface of a portion of cam member 51 are in a plane designated by 0° in Figure 4 and the rollers 43, on the lower ends of the racks 40, are supported on the upper surface of cam 50 and when the parts are in the position shown in Figure 5, the transverse axes of the blades are in the plane of rotation. If shaft 55 is now rotated so as to bring that part of the cam surfaces 58 which has been designated by reference character 22½, into engagement with the under surfaces of the longitudinally movable cam, their upper surfaces will be raised to the position designated by 22½° in Figure 4, and the blades will then have a 22½° pitch. By rotating shaft 55 until that portion of the cams 56 and 57, which has been designated by reference numeral 90° comes into contact with the under surface of cam member 51, the latter will be raised so that its upper surface will be in the plane of the line designated by 90° in Figure 4 and therefore whenever the rollers 43 are on this upper surface, which has been designated by reference numeral 59, the blades will be in the maximum pitch angle of 90°. It will be observed that cam member 51 has two surfaces, namely, the surface 59 and the surface 60, which are at different elevations and which are connected by inclined surfaces 61. At this point attention will be called to the fact that that portion of the cams 58, shown as connecting the two points 22½ in Figure 7, is concentric with the shaft 55 so that the innermost cam 50 does not move above the 22½° position.

Referring now to Figure 6, which shows a top plan view of the cams 50 and 51, it will be seen that the inclined surfaces 61 begin slightly to the right of the vertical diameter and extend for 53 degrees when they merge with the upper cam surface 59. The cam surface 61, at the bottom, is identical in extent and inclination with the one at the top and this leaves an arc of 164° for the lower surface 60. Attention is called at this point to the fact that the inclined surfaces 61 may extend 90 degrees instead of 53, or may be of any suitable angular length which may be found to be the best for effecting the results desired.

Figure 2:
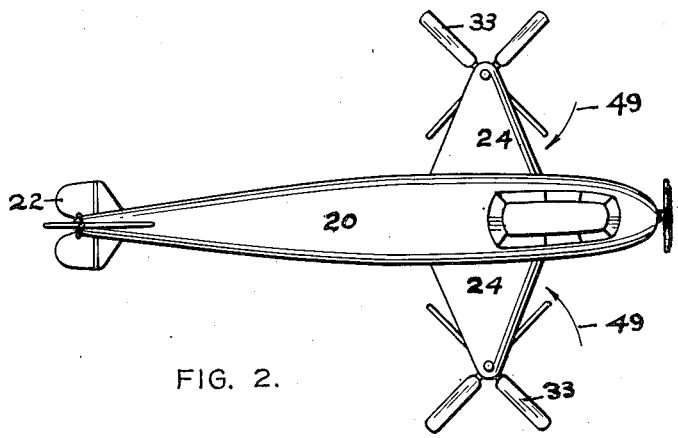
Figure 2 is a top plan view of the airplane shown in Figure 1.

Let us now assume that the parts above described have been assembled as shown in the drawings and that shaft 46 is rotated in such a direction as to produce a clockwise rotation of the upper propeller shown in Figure 2 and a counterclockwise rotation of the lower propeller. The racks and rollers associated with each propeller will rest on and follow the upper surfaces of cams 50 and 51 and the position of these surfaces will therefore determine the pitch angles of the blades. At this point attention will be called to Figure 4 from which it will be seen that the blades are pivoted nearer to the leading than to the following edges of the blades and that there is therefore always a force tending to rotate the blades in a clockwise direction when the propellers are operating. (This force tends to move the racks and rollers downwardly and keep them in engagement with the cam surfaces.)

Let us further assume that in the beginning of the operation the handle 62 that is secured to the shaft 55, is in such a position that its pawl 63 is in engagement with the notch 64 on the quadrant 65. When the parts are in this position the cams are in the zero degree position and remain in this position until the engine begins to function properly, whereupon the operator moves the handle 62 to the vertical position shown in Figure 8 and this moves the cams upwardly to the 22½° position. In this position all of the blades remain at 22½° during the complete rotary cycle and therefore exert only a lifting force. When the lifting force becomes sufficient to raise the ship from the ground, or to overcome the action of gravity, the pilot moves the handle 62 until the pawl engages with the notch 66 and this movement serves to raise the outer cam 51 so as to bring its surface 59 to the level of the 90° line shown in Figure 4, while the lower surface 60 remains on the level of the 22½° line. When the propellers rotate, the blades will be in the 22½° pitch position for 164°, when the relationship shown in Figure 6 is presented, but, as the rollers reach the incline 61, the racks move upwardly and change the pitch gradually from 22½° to 90°, the latter angle being reached when the rollers come to the top or into engagement with the cam surface 59. When the rollers reach the lowermost inclined surface, the pitch angle is gradually changed back to 22½°. It will be seen that so long as the blades have a pitch angle less than 90°, there is always a component producing a lifting force, whereas, when the pitch angle reaches 90° there is no lifting component and the blades exert merely a propelling force. It will be apparent that from the time the rollers begin to climb the incline 61 to the time that they again reach the lower surface 60, there is a propelling force that greatly exceeds the retarding force exerted by the blades while passing through the 164° arc, and this propelling force serves to move the ship forwardly. It has previously been pointed out that the length of the inclined surfaces 61 can be increased or decreased from that shown and the specific angular distances employed are therefore merely for the purpose of explanation.

When a ship constructed in the manner above described is in the air, its forward motion can be retarded and brought to a complete stop by lowering the cam 51 so that its upper surface 59 will be on the 22½° level. When such an airship is employed in war, for example, it can hover stationary over the target and the bombs or other missile will then drop perpendicularly onto any selected target. In still air it is therefore theoretically possible to hit any target, but if there is any appreciable air current suitable correction must, of course, be made.

In the embodiment above described, the position of the cams 50 and 51 are determined by the rotation of shaft 55. It is sometimes desirable to employ hydraulic mechanism for raising and lowering the cams and in Figures 14 to 17, a modified form of construction has been illustrated and this construction will now be described.

The modified construction is quite similar to that already described, except in certain details to which attention will now be called. Instead of having two concentric relatively longitudinally movable cams 51 and 52, a single circular cam 67 is employed. This cam is slidably, but nonrotatably connected with the bearing 26, interengaging splines and grooves being provided for this purpose. A semi-circular portion of the upper surface of cam 67 is depressed below the other part thereof, and this surface has been designated by line 68 in Figure 14. Positioned in the depressed semi-circular area is a semi-circular cam 69 which is connected with the cam 67 by a hinge that has been illustrated in Figure 16, consisting of a steel spring 70 secured to the two parts by means of screws 71. Although a spring connection has been shown as forming the hinge it is to be understood that any other suitable hinge construction can be employed. The construction shown in Figure 16, however, provides a smooth and gradually curved surface between the two inclined surfaces of members 67 and 69. It will be seen that the upper surfaces of members 69 and 67 are both provided with a circular groove 72, which forms a track for the rollers 43. The bottom of the groove 72 is preferably transversely concave as shown in Figure 14. For the purpose of raising and lowering the cam assembly two hydraulic cylinders 73 have been secured to the upper surface of the bracket 45. Positioned in each cylinder is a piston 74 that is connected with the cam 67 by means of connecting rods 75. Tension springs 76 serve to produce a force tending to move the member 67 downwardly. Suitable tubes 77 connect the cylinders with a source of liquid under pressure. When fluid under pressure is injected into the cylinders below the pistons, it will move the latter with their attached cam member 67 upwardly a distance corresponding to the pressure of the liquid. In its lowermost position the upper surface of member 67 corresponds to 0° pitch angle and by means of the hydraulic mechanism it can be raised so as to change the angle gradually from 0° to 22½° or any other suitable lifting angle. After the engine has been warmed up and the ship raised from the ground, the part 69 is tilted into the position shown in Figures 16 and 17, whereupon the pitch of the blades during their rearward movement will be increased from the lifting pitch to a maximum propelling pitch during half of the rotary movement. For the purpose of raising and lowering the part 69, a hydraulic cylinder 78 is secured to the under surface of members 67. The hydraulic cylinder 78 is connected by means of a rod 79 with the under surface of member 69. A compression spring 80 serves to produce a force tending to move the member 69 downwardly into the position shown in Figure 14. When liquid under pressure is supplied to the hydraulic cylinder 78 through the pipe 81, its piston is moved upwardly and cam member 69 is inclined in the manner shown in the drawings. When the propeller operates, the upward movement of the racks 40 as they enter and travel to the highest point on member 69, increase the pitch of the blades to a maximum of 90° and this pitch is gradually decreased during the downwardly movement of the rollers.

It will be observed that with the construction shown in Figures 14 and 17, the mode of operation practically identical with that shown in the other embodiment is obtained. The springs 76 and 80 serve to produce a force tending to return the liquid and the latter can therefore be controlled by ordinary three-way valves, so as to determine the position of the cam surfaces and the pitch of the blades.

Figure 3:
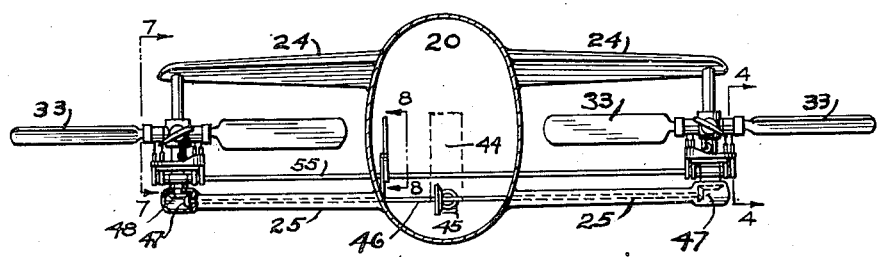
Figure 3 is a transverse section taken on line 3—3, Figure 1.

In Figures 1 to 3, the propellers have been shown as positioned on opposite sides of the fuselage. In Figures 12 and 13, a modified construction has been shown in which the propellers are positioned in longitudinally spaced relation the rearmost propeller being at a slightly higher elevation than the foremost, so as to bring it into air currents that have not been acted on by the foremost propeller. Short wings 82 are provided for stabilizing purposes. It will be seen from Figure 12 that the propellers rotate in opposite directions so as to neutralize each other's tendency to turn the ship.

Since the propeller blades are quite long and are subjected to vibration during operation, they are preferably positioned in a cylindrical tubular journal 83 and separated from the inner surface thereof by a rubber cushion 84 in the manner shown in Figure 10.

In the drawings the engine has been indicated by broken lines and is connected with the propeller driving machanism by the usual means, including a clutch.

In Figure 8 the quadrant has been shown as provided with three notches only, which correspond to the principal pitch adjustments. It is to be understood, however, that as many notches can be provided as may be desirable or necessary. By means of the handle 62 the cams can be moved gradually from one position to the other. Where hydraulic means like that shown in Figures 14 to 17 is employed, the pitch can be adjusted to any desired degree by proper manipulation of the fluid supply.

From the above description it will be apparent that a ship constructed in the manner described will possess several advantages over the ordinary airship due, more particularly to its ability to hover over an object and to rise substantially perpendicularly from the air field and similarly it may be landed in a substantially perpendicularly direction.

It is to be understod that as many pairs of propellers may be employed as may be found necessary or desirable and that the use of two propellers is merely for the purpose of illustration and is not to be considered in a limiting sense.

Having described the invention what is claimed as new is:

1. In combination with a propeller mounted for rotation about a vertical axis and having a plurality of blades mounted for pitch adjustment, means for changing the blade pitch while the propeller operates comprising, a two part cam plate encircling the axis of rotation of the propeller, a hinge means connecting the two parts, said means being formed to provide a smooth bridging cam surface across the hinge connection for all operative angular positions, means for changing the pitch of the blades in accordance with the distance from the cam to the propeller, comprising, members having one end in engagement with the cam surface and the other connected with the blades by means which translates rectilinear movement of the members into rotary movement of the blades, means for raising and lowering the cam, and means for warping the upper surface of the cam to effect a pitch variation during each propeller revolution.

2. In combination with a propeller mounted for rotation about a vertical axis and having a plurality of blades mounted for pitch adjustment, means for changing the blade pitch while the propeller operates comprising a two part cam plate encircling the axis of rotation of the propeller, a spring hinge connecting the two parts, means for changing the pitch of the blades in accordance with the distance from the cam to the propeller, comprising members having one end in engagement with the cam surface and the other connected with the blades by means which translates rectilinear movement of the members into rotary movement of the blades, the upper surface of the cam plate having a groove concentric with the axis of propeller rotation to resist centrifugal forces tending to move the translating devices outwardly, means for raising and lowering the cam, and means for warping the upper surface of the cam to effect a pitch variation during each propeller revolution.

DAVID W. MAIN.